US007931455B2

(12) United States Patent
Tabassi

(10) Patent No.: US 7,931,455 B2
(45) Date of Patent: Apr. 26, 2011

(54) INJECTION MOLDING APPARATUS HAVING MAGNETIC VALVE PIN COUPLING

(75) Inventor: Payman Tabassi, Rockwood (CA)

(73) Assignee: Mold-Masters (2007) Limited, Georgetown, ON (CA)

( * ) Notice: Subject to any disclaimer, the term of this patent is extended or adjusted under 35 U.S.C. 154(b) by 8 days.

(21) Appl. No.: 12/576,057

(22) Filed: Oct. 8, 2009

(65) Prior Publication Data

US 2010/0092588 A1 Apr. 15, 2010

Related U.S. Application Data

(60) Provisional application No. 61/104,585, filed on Oct. 10, 2008.

(51) Int. Cl.
*B29C 45/22* (2006.01)

(52) U.S. Cl. .......... 425/3; 264/328.9; 425/564; 425/572

(58) Field of Classification Search .............. 425/3, 564, 425/572; 264/328.9, 39
See application file for complete search history.

(56) References Cited

U.S. PATENT DOCUMENTS

| | | | | |
|---|---|---|---|---|
| 3,887,312 | A | 6/1975 | Seary | |
| 5,334,010 | A | 8/1994 | Teng | |
| 6,309,208 | B1 | 10/2001 | Kazmer et al. | |
| 6,638,049 | B1 * | 10/2003 | Moss et al. | 425/572 |
| 7,121,820 | B2 | 10/2006 | Tooman et al. | |
| 7,131,834 | B2 | 11/2006 | Babin et al. | |
| 7,210,922 | B1 | 5/2007 | Kohler | |
| 7,214,048 | B2 | 5/2007 | Kim | |
| 7,270,537 | B2 | 9/2007 | Doyle et al. | |
| 7,275,923 | B2 | 10/2007 | Tooman et al. | |
| 7,316,553 | B2 | 1/2008 | Teng et al. | |
| 7,341,445 | B2 | 3/2008 | Paris et al. | |
| 7,569,169 | B2 | 8/2009 | Vasapoli et al. | |
| 7,722,351 | B2 * | 5/2010 | Feick et al. | 425/564 |
| 2005/0048162 | A1 | 3/2005 | Teng et al. | |
| 2006/0222731 | A1 | 10/2006 | Paris et al. | |
| 2009/0102099 | A1 | 4/2009 | Feick et al. | |

FOREIGN PATENT DOCUMENTS

| | | |
|---|---|---|
| CA | 2366321 | 7/2001 |
| DE | 19611880 | 10/1997 |
| JP | 197924 | 6/1989 |
| JP | 2000-061995 | 2/2000 |
| JP | 2001-193596 | 7/2001 |
| JP | 3150283 U | 5/2009 |
| KR | 10-0514235 | 9/2005 |
| KR | 100655750 | 12/2006 |
| WO | WO-2006/080807 | 8/2006 |
| WO | WO 2009/120534 | 10/2009 |

OTHER PUBLICATIONS

"International Search Report and Written Opinion", *International Application* No. PCT/CA2008/001861 Jan. 20, 2009.

Baumann, Martin et al., "Electrically Actuated Valve Gates: An Emerging Hot Runner Technology", *MoldMaking Technology* Aug. 2008, 31-34.

Gray, Stephen et al., "Plate Actuated Hot Runner Valve Gates for Improved Part Quality and Molding Process Consistency", *ANTEC* 2009, 2991-2995.

"International Search Report and Written Opinion", *Int'l Appl* No. PCT/CA2009/001067 Oct. 7, 2009.

* cited by examiner

*Primary Examiner* — Tim Heitbrink
(74) *Attorney, Agent, or Firm* — Medler Ferro PLLC

(57) ABSTRACT

An actuated part, such as a valve pin plate or actuator piston, is movable in forward and rearward directions. A coupling part is located rearward of the actuated part and held in position by magnetic attraction between the coupling part and the actuated part. A valve pin is coupled to the coupling part. The valve pin extends in the forward direction for opening and closing a mold gate. When a stopping force applied to the valve pin is greater than a force of the magnetic attraction between the coupling part and the actuated part, the actuated part moves away from the coupling part in the forward direction, thereby reducing the stopping force on the valve pin.

20 Claims, 13 Drawing Sheets

100
104
102
125
124
103
106
127
108
122
110
126
109
114
116
118
128
120
112
107
132
130
129
CS
123
105
119
121
OS
117
115
111
113
$P_L$

INJECTION MOLDING APPARATUS HAVING MAGNETIC VALVE PIN COUPLING

CROSS-REFERENCE TO RELATED APPLICATION

This application claims the benefit under 35 U.S.C §119 (e) of U.S. Appl. No. 61/104,585 filed Oct. 10, 2008, which is incorporated by reference herein in its entirety.

FIELD OF THE INVENTION

The present invention relates to injection molding, and more particularly, to an injection molding apparatus having a valve pin.

BACKGROUND OF THE INVENTION

Injection molding apparatuses, such as hot halves and hot runners, commonly use valve pins to control flow of molding material.

Improper valve pin operation can cause damage to a valve pin itself or to surrounding components, such as a nozzle tip, nozzle tip liner, nozzle tip guide sleeve, or mold gate. For example, on the close stroke, when the tip of a valve pin is pushed into the mold gate area, the tip of the valve pin can collide with a foreign object blocking the mold gate. Such a foreign object may be a contaminant. Unexpectedly frozen molding material in the gate area can also act as a blockage. The result is that damage to the valve pin or surrounding components can occur. Similarly, a valve pin can seize before reaching the end of its close stroke, whether this be induced by material seeping between surfaces having a high-tolerance sliding relationship or by some other cause. These problems can be exasperated when several valve pins are ganged together to be actuated in unison by, for example, a common valve pin plate. In this case, the entire force transmitted by the actuators to all the valve pins may be taken by a single valve pin that encounters a blockage, becomes seized, or encounters some other motion inhibiting condition.

Replacement of a damaged valve pin or related component can be time consuming and costly.

BRIEF SUMMARY OF THE INVENTION

Embodiments hereof are directed to an injection molding apparatus having an actuated part that moves a valve pin to open and close a mold gate, wherein the valve pin is magnetically coupled to the actuated part. When a stopping force applied to the valve pin, as the valve pin is being closed, is greater than a force of magnetic attraction holding the valve pin to the actuated part, the valve pin separates from the actuated part.

BRIEF DESCRIPTION OF THE FIGURES

The foregoing and other features and advantages of the invention will be apparent from the following description of embodiments thereof as illustrated in the accompanying figures. The accompanying figures, which are incorporated herein and form a part of the specification, further serve to explain the principles of the invention and to enable a person skilled in the pertinent art to make and use the invention. The figures may not be to scale.

DETAILED DESCRIPTION OF THE INVENTION

Specific embodiments of the present invention are now described with reference to the figures, wherein like reference numbers indicate identical or functionally similar elements. The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
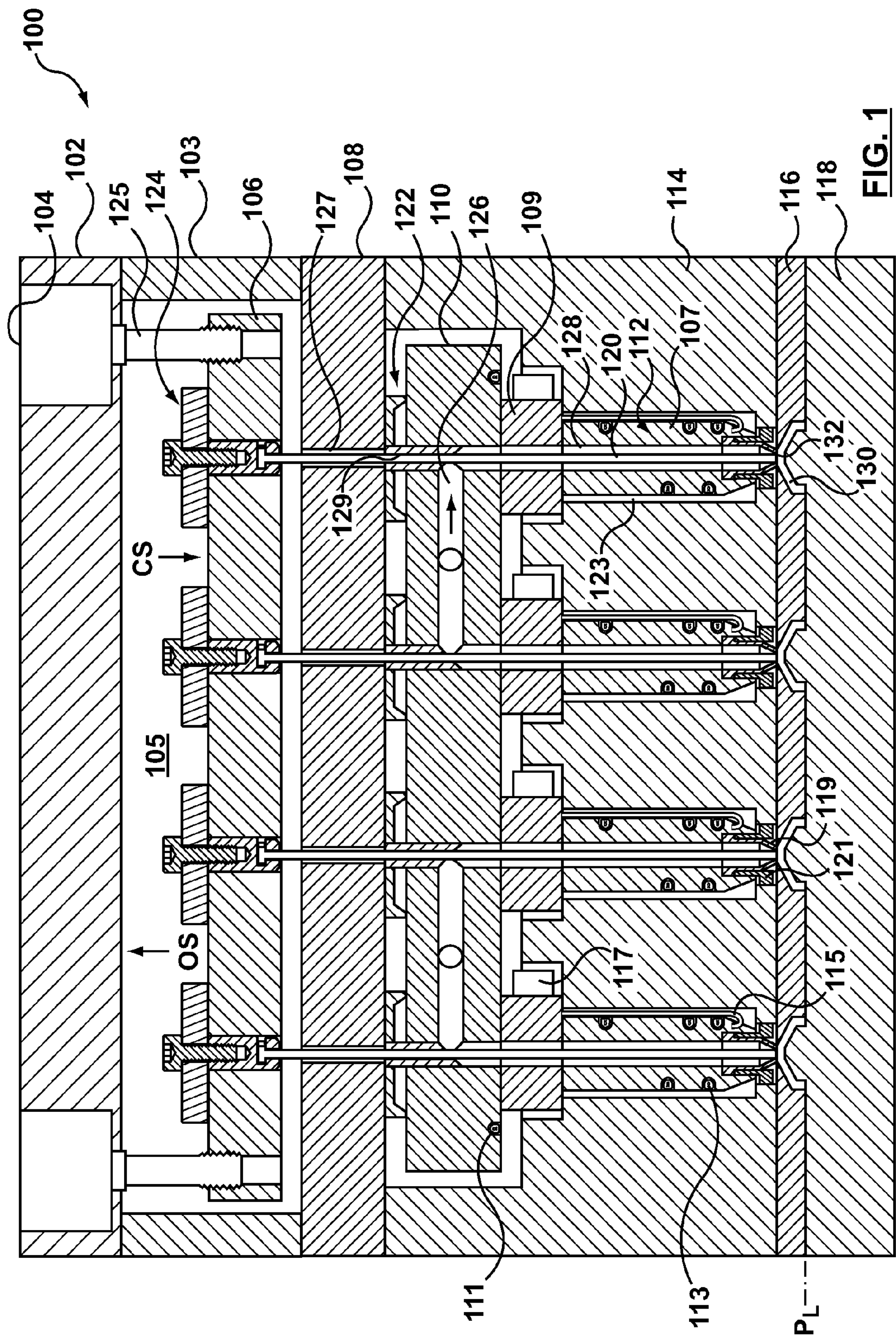
FIG. 1 is a sectional view of an injection molding apparatus according to an embodiment of the present invention.

Embodiments hereof relate to, among other things, nozzles and components which can be used in an injection molding apparatus such as the injection molding apparatus 100 shown in FIG. 1. The features and aspects described for the other embodiments can be used accordingly with the present embodiment. In the following description, “downstream” is used with reference to the direction of mold material flow from an inlet of the injection molding system to a mold cavity, whereas “upstream” is used with reference to the opposite direction. Similarly, “forward” is used with reference to a direction towards a parting line between a mold cavity plate and a mold core, whereas “rearward” is used with reference to a direction away from the parting line.

Injection molding apparatus 100 includes an actuator plate 102 and an actuator support plate 103, actuators 104, a valve pin plate 106, a back plate 108, a manifold 110, nozzles 112, a mold plate 114, a cavity plate 116, a core plate 118, valve pins 120, valve pin bushings 122, and magnetic couplings 124. Injection molding apparatus 100 can include any number of manifolds and nozzles, in any configuration. In this embodiment, one manifold is shown for simplicity. Injection molding apparatus 100 can include additional components, such as mold plates, alignment dowels, mold gate inserts, cooling channels, bolts, lifting holes, among others without departing from the scope hereof.

Actuator plate 102 has openings for accommodating actuators 104. If actuators 104 depend on a working fluid for operation, i.e., pneumatic or hydraulic types, fluid conduits (not shown) can be provided in actuator plate 102. Should actuators 104 be electric or magnetic or of some other design, electrical conduits (not shown) can be provided in actuator plate 102. Actuator support plate 103 has a pocket 105 to accommodate valve pin plate 106.

Actuators 104 are disposed in actuator plate 102 and can be pneumatic, hydraulic, electric, magnetic, or of some other design. Actuators 104 can translate valve pin plate 106 between an open and closed position by linear motion, e.g., a pneumatic piston, or rotary motion, e.g., an electric screw drive. To accomplish this, each actuator 104 has a stationary part, e.g., a housing or cylinder, connected to actuator plate 102 and also has a movable part 125, e.g., a piston or part connected to the piston and extending therefrom connected to valve pin plate 106. The number of actuators is a design choice, and in other embodiments more or fewer actuators can be used. Any style of actuator is suitable, provided it can translate valve pin plate 106 and valve pins 120 between an open and closed position.

Valve pin plate 106 is connected to movable part 125 of each actuator 104. Valve pin plate 106 has a plurality of openings associated with magnetic couplings 124. Valve pin plate 106 moves in an axial longitudinal direction toward manifold 110, and away from manifold 110 in response to the actuation of the actuators 104. Movement of valve pin plate 106 and associated valve pins 120 toward manifold 110 and the mold gates 132 can be described as closing CS, whereas movement of valve pin plate 106 and associated valve pins 120 away from manifold 110 and mold gates 132 can be described as opening OS. Valve pin plate 106 need not be a plate as such, but can be any rigid member capable of connecting one or more actuators to a plurality of magnetic couplings 124 and their respective valve pins 120. In other embodiments, the valve pin plate 106 is an assembly of stacked plates.

Back plate 108 is disposed between valve pin plate 106 and valve pin bushings 122 and serves to secure valve pin bushings 122 against manifold 110. Back plate 108 has several bores 127 through which valve pins 120 extend.

Manifold 110 defines a manifold channel 126 (partially shown) and includes a manifold heater 111. Manifold channel 126 receives a melt stream of moldable material, e.g., plastic melt, from an inlet component (not shown) or an upstream manifold (not shown). Manifold heater 111 can be of any design, such as the insulated resistance wire illustrated. It should also be mentioned that, because of the plate interconnections (not shown), manifold 110 is stationary in the actuation direction, i.e., fixed in a longitudinal direction, relative to the stationary parts of actuators 104.

Nozzles 112 are abutted against manifold 110 and each nozzle 112 defines one of a plurality of nozzle channels 128 in fluid communication with manifold channel 126. In the embodiment shown in FIG. 1, each nozzle 112 includes a nozzle body 107, a nozzle flange 109, a nozzle heater 113 embedded in the nozzle body 107, a thermocouple 115, a terminal end 117 for connecting the heater to a power source (not shown), a nozzle tip 119 of a thermally conductive material, and a tip retainer 121 of a less thermally conductive material than nozzle tip 119. Nozzles 112 in combination with manifold 110 may be referred to as a hot runner system.

Mold plate 114 has wells 123 to accommodate and support nozzles 112. Wells 123 are sized to thermally insulate nozzles 112 from mold plate 114.

Cavity plate 116 and core plate 118 define the mold cavities 130, and cavity plate 116 defines mold gates 132 leading into mold cavities 130. Cavity plate 116 and core plate 118 are separable along a parting line $P_L$ to allow ejection of molded products from mold cavities 130. In another embodiment (not shown), a single cavity can be fed molding material by several nozzles.

Each of the valve pins 120 extends from a magnetic coupling 124 to a mold gate 132 through back plate 108, valve pin bushing 122 and nozzle channel 128 for controlling flow of molding material through the respective mold gate 132 and into the respective mold cavity 130 when actuated between an open and closed position.

Each valve pin bushing 122 is held to manifold 110 by back plate 108. Each valve pin bushing 122 includes a disc-shaped main body and a cylindrical bushing portion connected to and extending from the main body and into the manifold 110. Each valve pin bushing 122 has a valve pin bore 129, which creates a seal with valve pin 120 while still allowing valve pin 120 to slide in an axial direction.

Each magnetic coupling 124 couples a respective valve pin 120 to valve pin plate 106. Each magnetic coupling 124 directly transmits actuator opening force to the respective valve pin 120 when valve pins 120 are being opened, i.e. moved away from mold gates 132 in an opening direction OS. Each magnetic coupling 124 also applies a magnetic force to valve pin plate 106 thereby attaching magnetic coupling 124 and associated valve pins 120 to valve pin plate 106 when valve pins 120 are being closed, i.e. moved towards mold gates 132. During normal operation, the magnetic force of a respective magnetic coupling 124 is sufficient to keep a respective valve pin 120 coupled to valve pin plate 106 when the valve pin is closed with respect to mold gate 132. However if one of the valve pins 120 cannot fully close because of a stopping force encountered by the valve pin when valve pin plate 106 is actuated in the closing direction, the aforementioned magnetic force is overcome by the stopping force such that the magnetic coupling 124 associated the valve pin 120 experiencing the stopping force disengages or decouples from valve pin plate 106 and the remaining unobstructed valve pins 120 continue to move together with valve pin plate 106 in the closing direction. A non-limiting example of a stopping force includes an obstruction in nozzle melt channel 128, a valve pin 120 becoming seized, and frozen melt in nozzle melt channel 128.

The embodiments described herein can be used to prevent damage to an injection molding gate area. A valve pin is magnetically coupled to an actuated part, such as a valve pin plate or actuator piston. During normal operation, the valve pin is moved towards a closed position by moving the actuated part. Operational problems may occur, and one or more valve pins may receive a stopping force resulting from an obstruction in the gate area or other problem, and the respective mold gates may not fully close. In response to the stopping force, the magnetic coupling can separate the valve pin from the actuated part, thereby reducing the stopping force acting on the valve pin and reducing damage to the gate area.

Figure 2:
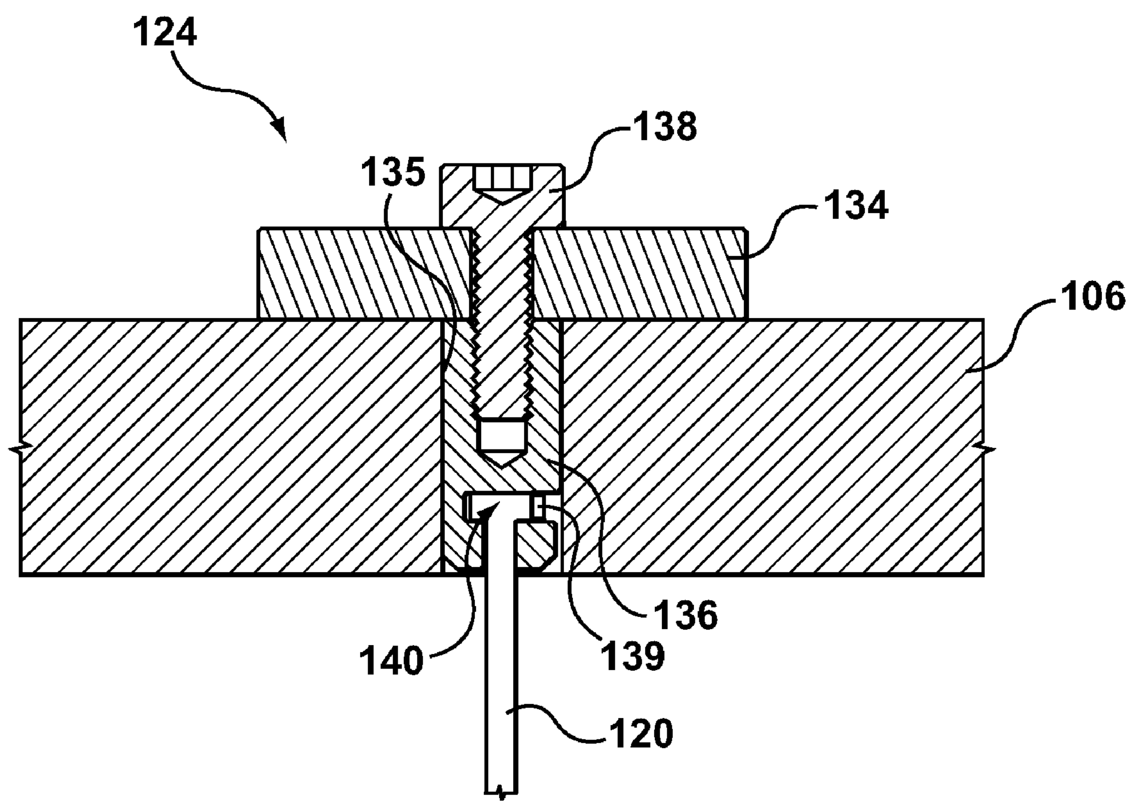
FIG. 2 is an enlarged sectional view of a magnetic coupling in a portion of the injection molding apparatus shown in FIG. 1 in a position for normal operation.

FIG. 2 illustrates an enlarged sectional view of magnetic coupling 124 shown in a portion of injection molding apparatus 100 of FIG. 1. A coupling part 134 is located on an upstream side of valve pin plate 106. Coupling part 134 is connected to valve pin plate 106 by an attractive magnetic force. Such an attractive magnetic force can be generated by coupling part 134 being a magnet and valve pin plate 106 being made of magnetically responsive material, for e.g. a steel plate as shown in FIG. 2. Alternatively, coupling part 134 may be made of magnetically responsive material, with valve pin plate 106 being magnetic, e.g., a metal plate with an embedded magnet (not shown). A magnet can be a permanent magnet, e.g., a neodymium magnet or a samarium-cobalt magnet, an electromagnet, or a combination of such, provided that an attractive magnetic force can be generated between coupling part 134 and valve pin plate 106. Coupling part 134 is annular, and is coaxially aligned with a bore 135 extending through valve pin plate 106. Coupling part 134 has an outer circumference with a diameter greater than a diameter of bore 135, and an inner circumference for receiving fastener 138. A non-limiting example of a fastener is a socket head cap screw however one skilled in the art will appreciate that a screw, a shoulder bolt or any other type of fastener could also be used. If bore 135 is of some other shape, coupling part 134 can be shaped accordingly to span it. Non-limiting examples of other shapes for opening 135 include an open notch extending through the edge of valve pin plate 106, a square or rectangular hole extending through valve pin plate 106, and an oval hole extending through valve pin plate 106.

Valve pin 120 is coupled to coupling part 134 via a valve pin holder 136. Valve pin holder 136 is fastened to coupling part 134 by fastener 138. Valve pin holder 136 has a slot 139 for receiving a head 140 of valve pin 120 to couple valve pin 120 to valve pin holder 136. Valve pin holder 136 lies within bore 135 in valve pin plate 106 and is slidable therethrough. Valve pin 120 extends in the forward direction from valve pin holder 136 for opening and closing a respective mold gate 132.

Figure 3:
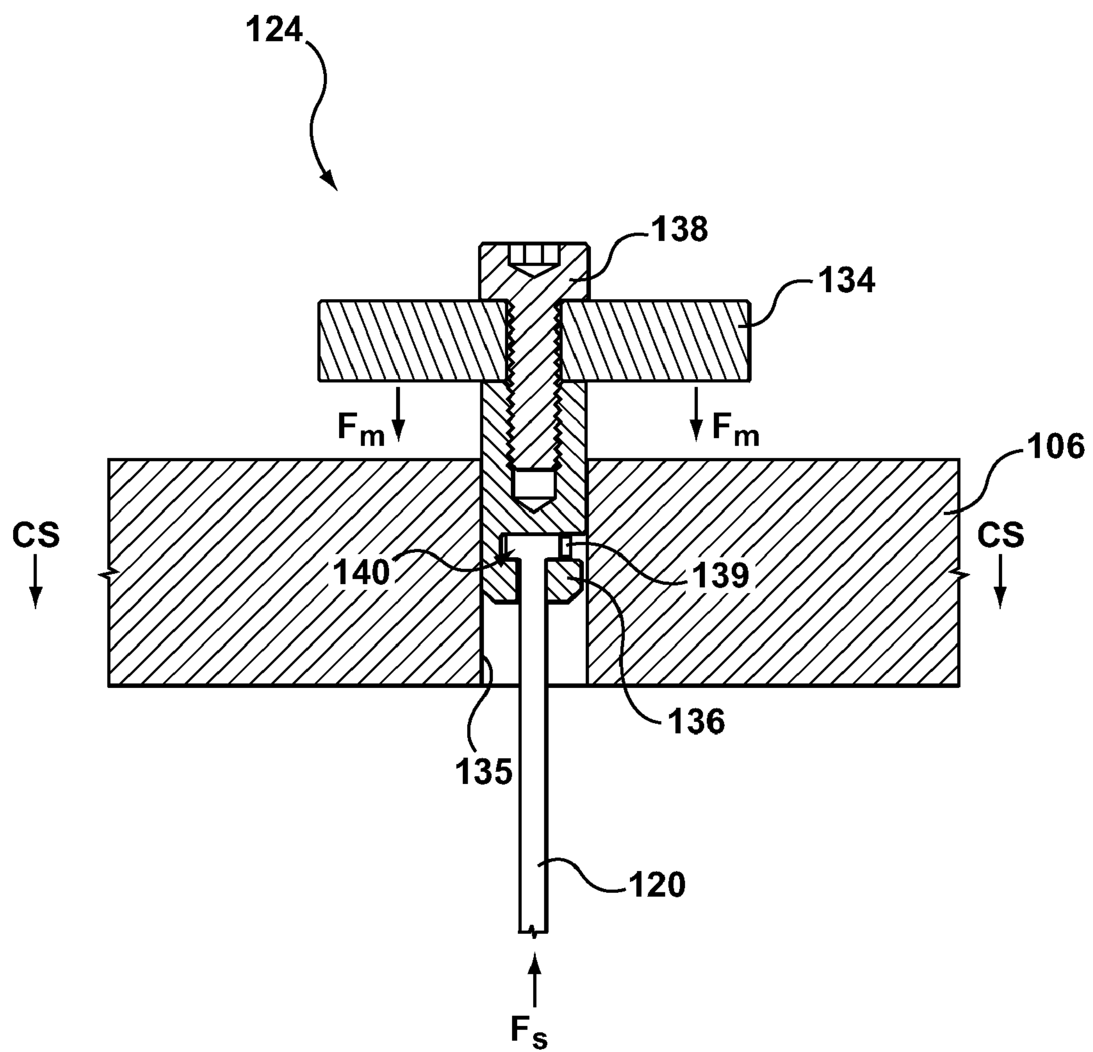
FIG. 3 illustrates the magnetic coupling of FIG. 2 in a decoupled position.

With reference to FIGS. 2 and 3, the attractive magnetic force $F_M$, between coupling part 134 and valve pin plate 106 can be designed to respond as desired. In a non-limiting example, if the maximum allowable stopping force $F_S$ is determined to be 500 N (about 112 pounds) before valve pin or mold gate damage occurs, then coupling part 134 can designed to have an attractive magnetic force capable of holding up to 500 N. If valve pin 120 encounters stopping force $F_S$ of less than 500 N, coupling part 134 remains magnetically attached to valve pin plate 106 and thus pushes valve pin 120 through the obstruction. On the other hand, if the stopping force $F_S$ encountered by valve pin 120 is greater than 500 N, the attractive magnetic force $F_M$ between coupling part 134 and valve pin plate 106 will be overcome by the stopping force $F_S$ of the obstruction as described below.

FIG. 3 depicts magnetic coupling 124 as described in FIG. 2 when valve pin 120 cannot fully close mold gate (not shown) because of a stopping force $F_S$. When a stopping force $F_S$, is applied to valve pin 120 when valve pin plate 106 is actuated in the closing direction CS, stopping force $F_S$ is transmitted through valve pin 120 and valve pin holder 136 into coupling part 134. When the stopping force $F_S$ is greater than the force of magnetic attraction $F_M$ between coupling part 134 and valve pin plate 106, valve pin plate 106 and coupling part 134 decouple as shown in FIG. 3. Valve pin plate 106 continues to move the remaining unobstructed valve pins (not shown) in the closing direction while the aforementioned assembly of valve pin 120, valve pin holder 136, and coupling part 134 that experienced the stopping force $F_S$ remain stationary. When decoupling between valve pin plate 106 and a certain valve pin 120 occurs, valve pin plate 106 is no longer applying actuating pressure on that valve pin 120 against the stopping force $F_S$ and the effect of the stopping force $F_S$ on valve pin 120 is reduced and potential damage to the gate area is accordingly reduced.

When valve pin 120 is moved in the axial direction away from mold gate 132, the direct contact between coupling part 134 and valve pin plate 106 provides as much force as required to open mold gate 132, limited only by the mechanical strength of the components or available actuator power. When a permanent magnet or any of the aforementioned magnets is used to couple valve pin plate 106 to coupling part 134, the attractive magnetic force $F_M$ between magnetic coupling 134 and valve pin plate 106 drops sharply with the distance of separation between the two components, thereby providing an on-off type action at the maximum allowable stopping force.

Figure 4:
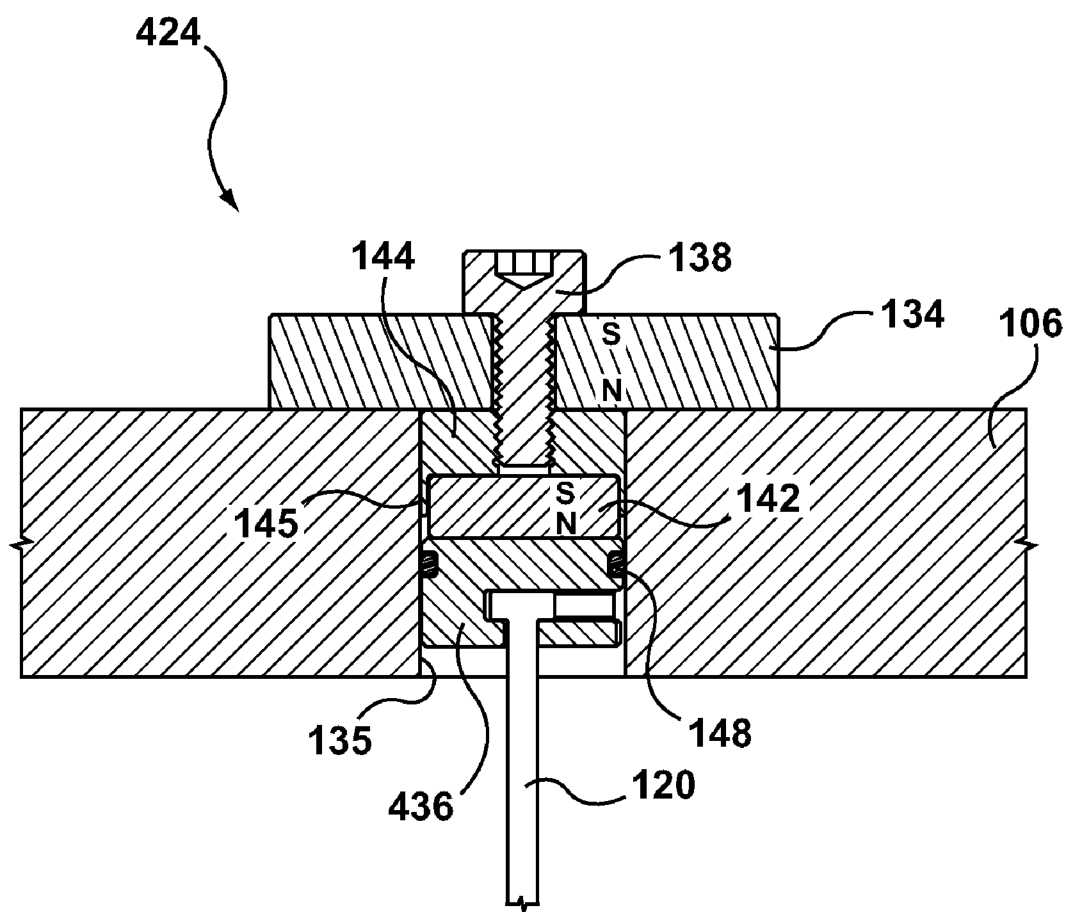
FIG. 4 is a sectional view of a double-acting magnetic coupling in a portion of an injection molding apparatus in accordance with another embodiment hereof.

FIG. 4 is a sectional view of a double-acting magnetic coupling 424 in accordance with another embodiment hereof that may be adapted for use in the injection molding apparatus 100 of FIG. 1. Features and aspects of the other embodiments can be used with the present embodiment. In this embodiment, double-acting magnetic coupling 424 includes a second coupling part 142 in addition to coupling part 134. Second coupling part 142 couples a valve pin holder 436 and a respective valve pin 120 to a holder or intermediate coupling part 144 which is connected to coupling part 134. Second coupling part 142 is located downstream of coupling part 134 and is held in position by magnetic attraction between second coupling part 142 and intermediate coupling part 144. Second coupling part 142 is a permanent magnet. Alternatively, coupling part 142 may be any suitable magnet such as any one of the aforementioned magnets. Intermediate coupling part 144 has a shoulder 145 for seating second coupling part 142. Valve pin 120 is held to second coupling part 142 by magnetic attraction acting upon valve pin holder 436 with which valve pin 120 is engaged. Valve pin holder 436 may include an O-ring 148 to prevent dust or other debris from coming between valve pin holder 436 and second coupling part 142. Intermediate coupling part 144, second coupling part 142, and valve pin holder 436 are further described in U.S. Patent App. Pub. No. 2009/0102099 A1 to Feick et al., which is incorporated by reference herein in its entirety.

Second coupling part 142 serves to allow valve pin 120 to separate from valve pin plate 106 if a stopping force $S_F$ similar to the aforementioned stopping force $F_S$ is encountered by valve pin 120 when valve pin plate 106 is moved in the opening direction OS rather than in the closing direction CS. The strengths of the magnetic attractive forces of the coupling part 134 and second coupling part 142 can be selected and balanced accordingly. In this embodiment, coupling part 134 and second coupling part 142 are both axially magnetized permanent magnets with opposite poles facing each other, e.g., N facing S. A resulting attractive force thus exists between coupling part 134 and second coupling part 142.

Figure 5:
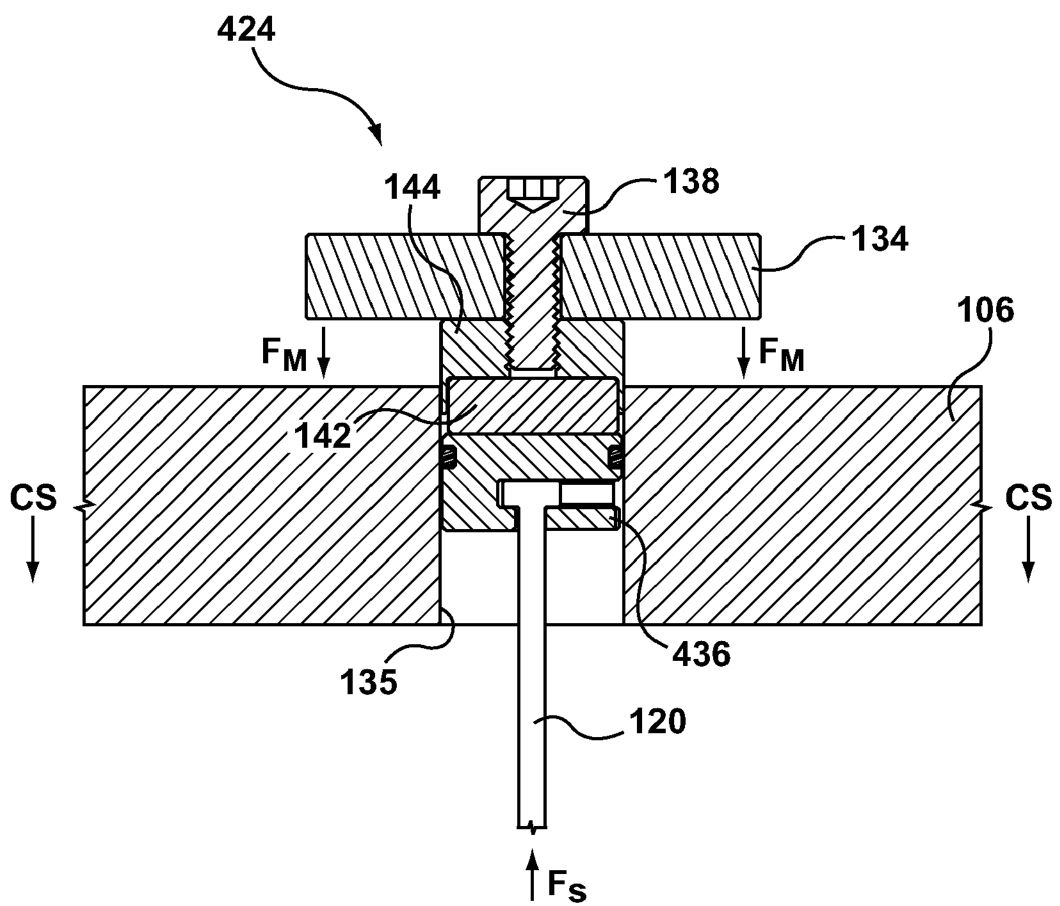
FIG. 5 illustrates the double-acting magnetic coupling of FIG. 4 separating on a forward stroke.

FIG. 5 shows double-acting magnetic coupling 424 separating when actuator plate 106 is moved in the closing direction CS. Similar to what is depicted in FIG. 3, the stopping force $F_S$ experienced by valve pin 120 overcomes the attractive magnetic force $F_M$ between coupling part 134 and valve pin plate 106 and allows valve pin plate 106 to continue moving the remaining valve pins (not shown) which have not experienced a stopping force in the closing direction.

Figure 6:
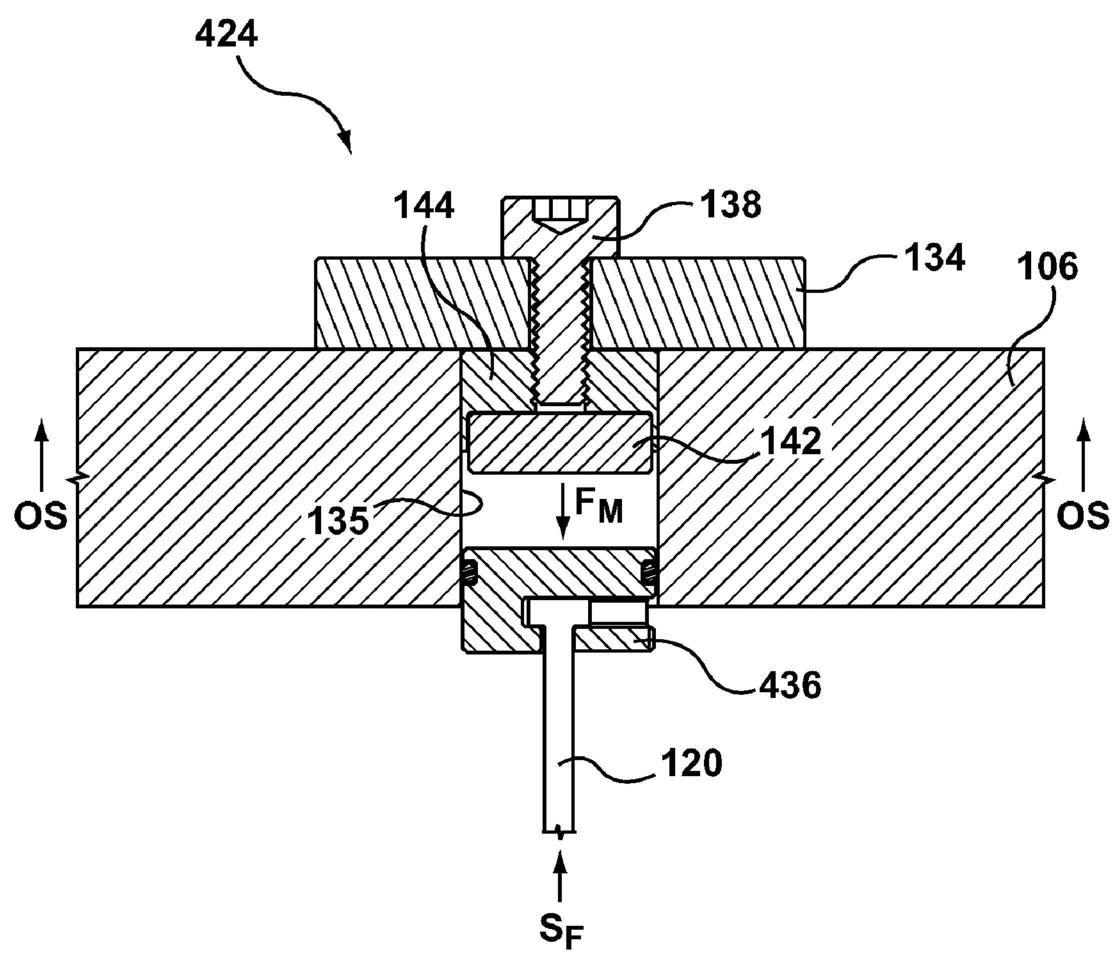
FIG. 6 illustrates the double-acting magnetic coupling of FIG. 4 separating on a rearward stroke.

FIG. 6 shows double-acting magnetic coupling 424 separating when valve pin plate 106 is actuated in the opening direction OS. The stopping force $S_F$,e.g., by frozen melt or other issue, experienced by valve pin 120 overcomes the attractive magnetic force between second coupling part 142 and valve pin holder 436 and remains magnetically attached to intermediate coupling part 144. Conversely, the stopping force $S_F$ experienced by valve pin 120 may instead overcome the attractive magnetic force between second coupling part 142 and intermediate coupling part 144 such that second coupling part 142 remains magnetically attached to valve pin holder 436.

Figure 7:
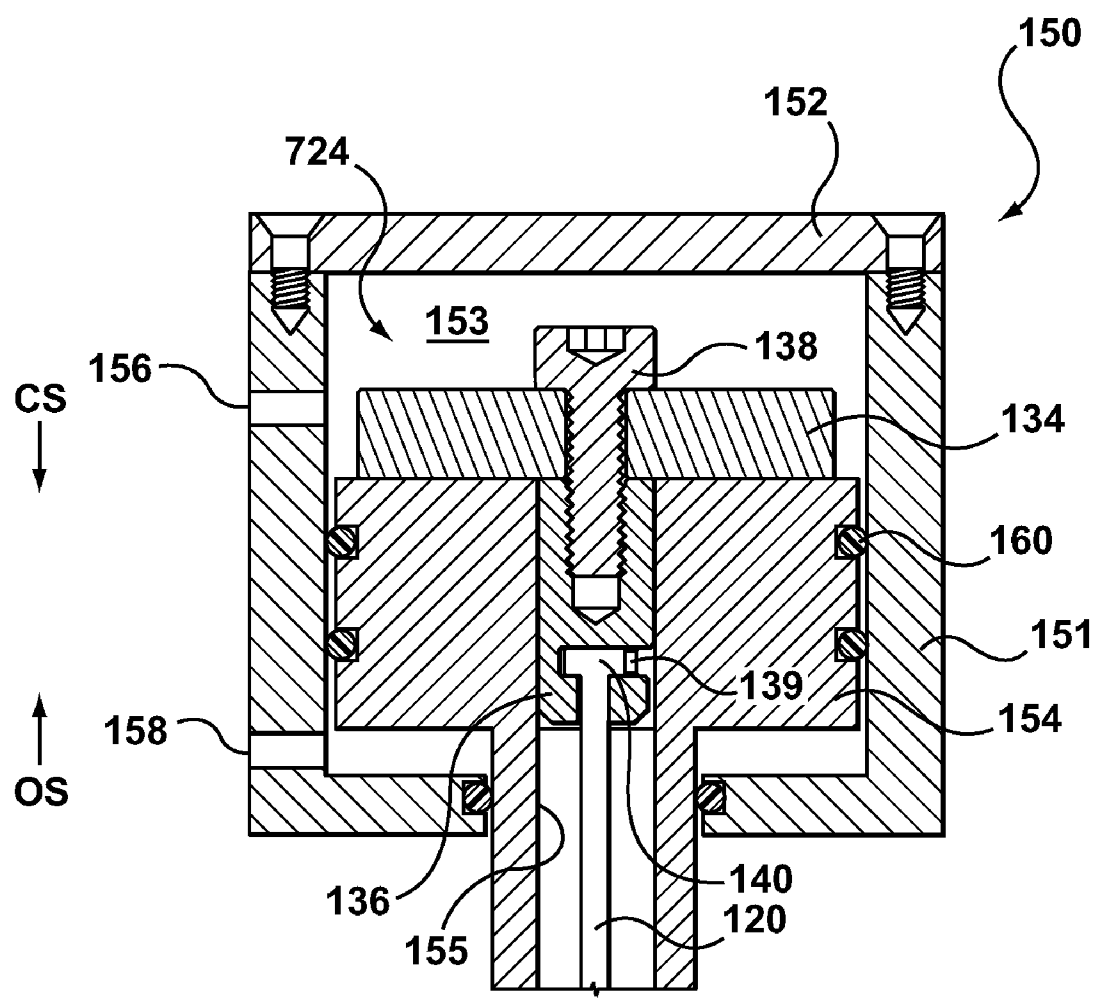
FIG. 7 is a sectional view of a magnetic coupling in an actuator in accordance with another embodiment hereof.

FIG. 7 shows an embodiment of a magnetic coupling 724 within an actuator 150 in accordance with another embodiment hereof that may be adapted for use in the injection molding apparatus 100 of FIG. 1. Features and aspects of the other embodiments may be used with the present embodiment.

Actuator 150 includes a housing 151 and a cap 152 enclosing a chamber 153. A piston 154 resides in chamber 153 and is slidable within housing 151 in the manner of a conventional piston-cylinder arrangement. Fluid pressure applied to port 156 will cause piston 154 and valve pin 120 to move in the closing direction CS. Fluid pressure applied to port 158 will cause piston 154 and valve pin 120 to move in the opening direction OS. Fluid pressure may be hydraulic or pneumatic. Seals, such as O-rings 160, are provided to seal against actuator fluid leakage. Similar to the valve pin plate in the previous embodiments, piston 154 is an actuated part for moving valve pin 120 to open or close a mold gate (not shown). Thus, coupling part 134 is located on the rearward side of piston 154 and is held in location by an attractive magnetic force $F_M$. Magnetic attraction can be generated by coupling part 134 being a magnet and the piston 154 being made of magnetically responsive material, e.g., steel. Conversely, coupling part 134 may be made of magnetically responsive material with piston 154 being magnetic. Coupling part 134 straddles a bore 155 extending coaxially through piston 154. Coupling part 134 is annular and has an outer circumference with a diameter that is greater than a diameter of bore 155. If bore 155 is of some other shape, coupling part 134 can be shaped accordingly to straddle it. Non-limiting examples of other shapes for bore 155 include a square or rectangular hole extending through piston 154, and an oval hole extending through piston 154.

As described above with respect to the embodiment of FIG. 2, valve pin 120 is coupled to coupling part 134 via valve pin holder 136, which is fastened to coupling part 134 by fastener 138. A non-limiting example of a fastener is a socket head cap screw however one skilled in the art will appreciate that a screw, a shoulder bolt or any other type of fastener could also be used. Valve pin holder 136 has a slot 139 for receiving head 140 of valve pin 120 to couple valve pin 120 to valve pin holder 136. Valve pin holder 136 extends through bore 155 in piston 154 and is slidable therethrough. Valve pin 120 extends in a forward direction for opening and closing a respective mold gate (not shown).

Operation of this embodiment is similar to what is described for the embodiment of FIGS. 2 and 3 such that if valve pin 120 experiences a stopping force $F_S$ as piston 154 moves in the closing direction CS than coupling part 134 and valve pin 120 will decouple from piston 151. Further the coupling mechanisms described in each of the other embodiments with a valve pin plate can be adapted for use with actuator 150, as described in this embodiment.

Figure 8:
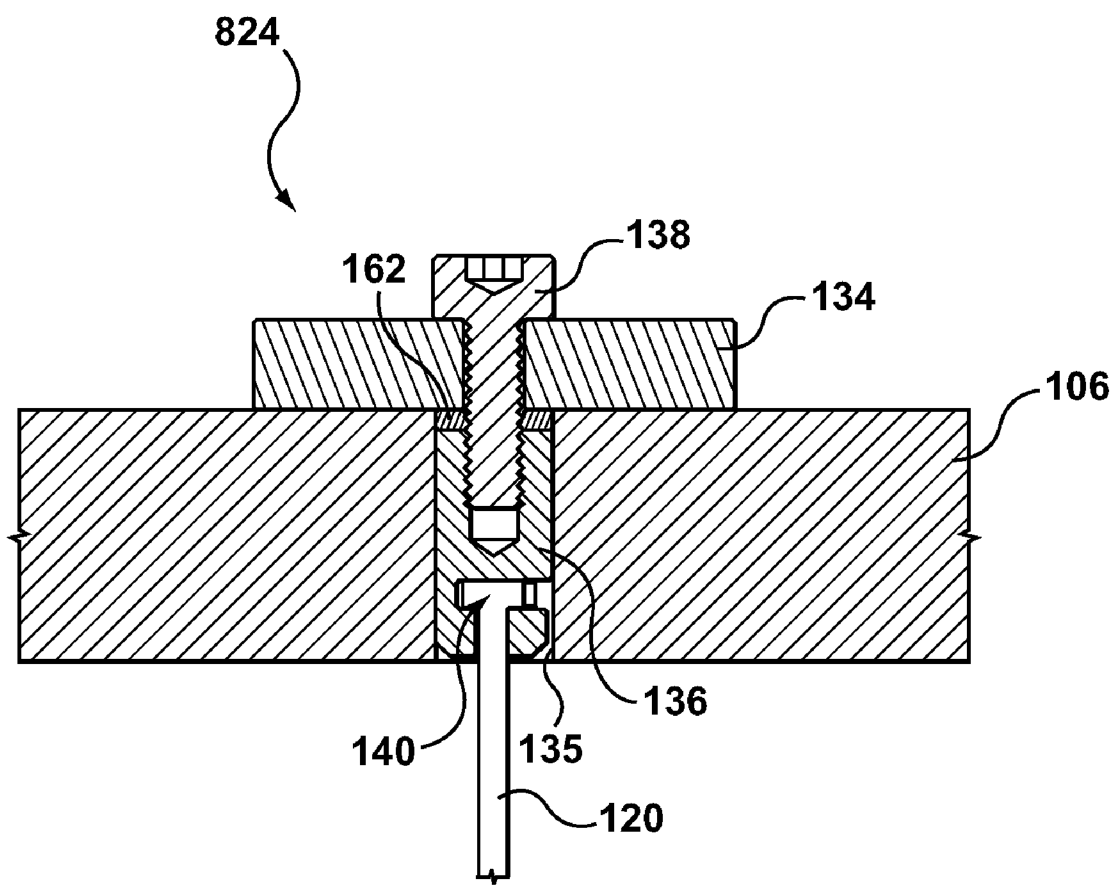
FIG. 8 is a sectional view of a magnetic coupling having a washer for adjustment in a portion of an injection molding apparatus in accordance with another embodiment hereof.

FIG. 8 is a sectional view of a magnetic coupling 824 in accordance with another embodiment hereof that may be adapted for use in the injection molding apparatus 100 of FIG. 1. Features and aspects of the other embodiments can also be used with the present embodiment. Magnetic coupling 824 is a similar to magnetic coupling 124 described with reference to FIGS. 2 and 3 except for the addition of a spacing washer 162 that is located between valve pin holder 136 and coupling part 134. Spacing washer 162 is provided to allow for adjusting a forward end position (not shown) of valve pin 120, so as to accurately set the position of valve pin 120 within a mold gate (not shown) when actuator plate 106 is in the closed position. To this end, spacing washer 162 may be manufactured to a desired thickness or may be replaced by one or more spacing washers of different thicknesses to properly shim valve pin holder 136 for accurate positioning of the valve pin within the mold gate. The remaining features and operation of the embodiment of FIG. 8 are as described with respect to the embodiment of FIGS. 2 and 3.

Figure 9:
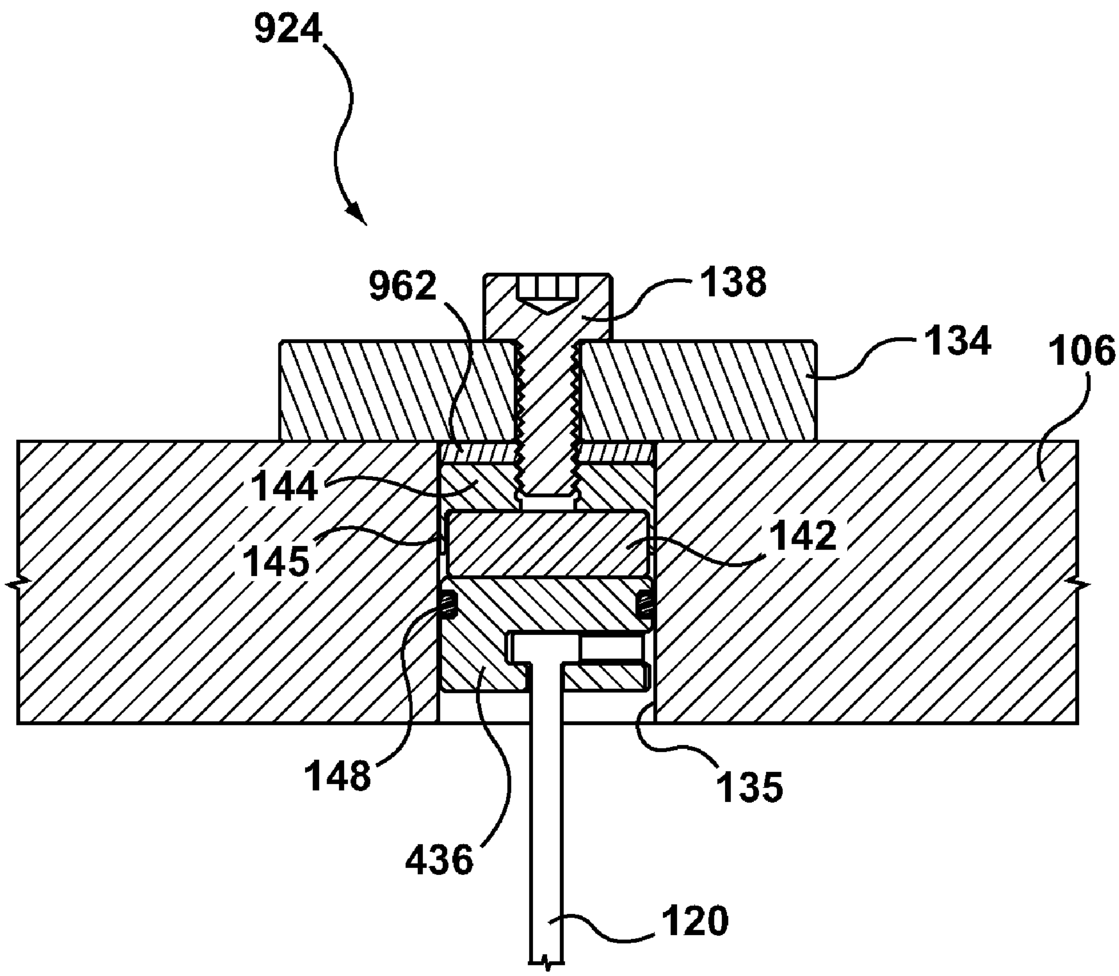
FIG. 9 is a sectional view of a double-acting magnetic coupling having a washer for adjustment in a portion of an injection molding apparatus in accordance with another embodiment hereof.

FIG. 9 is a sectional view of a double-acting magnetic coupling 924 in accordance with another embodiment hereof that may be adapted for use in the injection molding apparatus 100 of FIG. 1. Features and aspects of the other embodiments can be used with the present embodiment. Double-acting magnetic coupling 924 is a similar to double-acting magnetic coupling 424 described with reference to FIGS. 4-6 except for the addition of a spacing washer 962 that is located between intermediate coupling part 144 and coupling part 134. Spacing washer 962 serves the same purpose of spacing washer 162 described in the embodiment of FIG. 8. The remaining features and operation of the embodiment of FIG. 9 are as described with respect to the embodiment of FIGS. 4-6.

Figure 10:
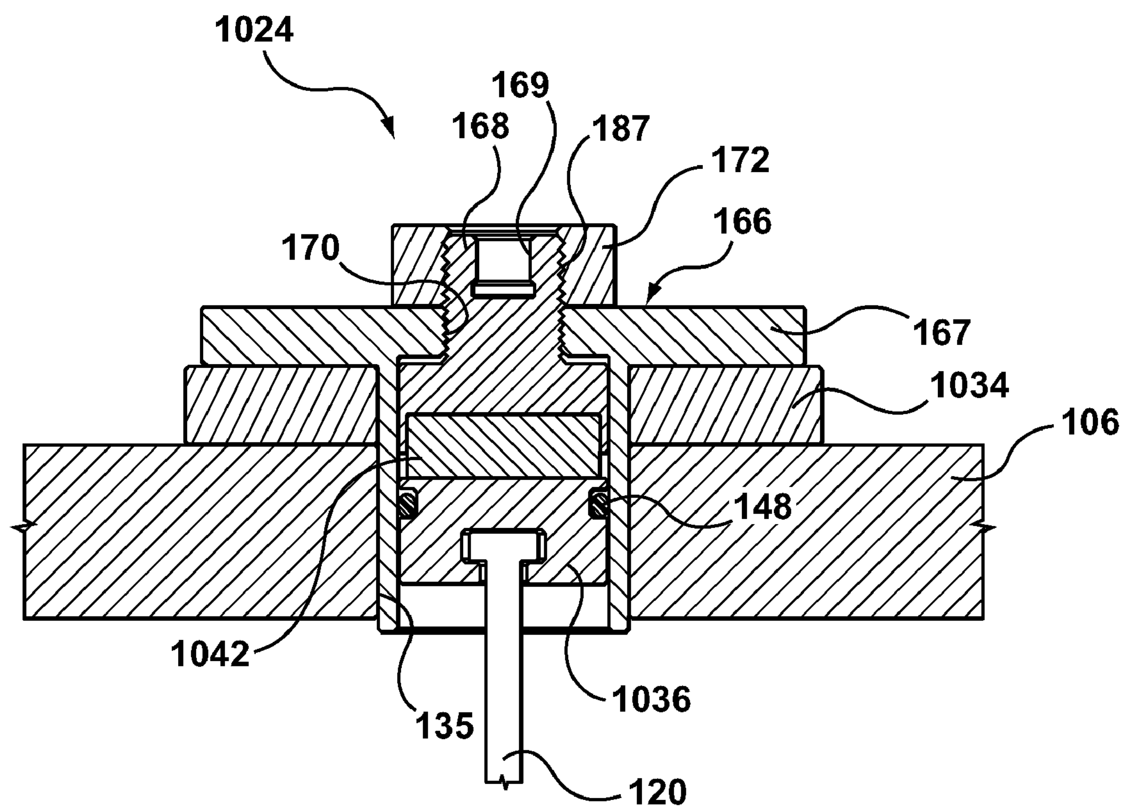
FIG. 10 is a sectional view of a double-acting magnetic coupling with adjustability in a portion of an injection molding apparatus in accordance with another embodiment hereof.

FIG. 10 is a sectional view of a double-acting magnetic coupling 1024 in accordance with another embodiment hereof that may be adapted for use in the injection molding apparatus 100 of FIG. 1. Features and aspects of the other embodiments can be used with the present embodiment. Double-acting magnetic coupling 1024 is similar to double-acting magnetic coupling 424 described with reference to FIGS. 4-6 except for a large holder or an outer coupling component 166 is provided. Outer coupling component 166 has a flange 167 that is magnetically attracted to coupling part 1034 and valve pin plate 106. Located within outer coupling component 166 are a small holder or an inner coupling component 168, a second coupling part 1042, and a valve pin holder 1036 with O-ring 148. Second coupling part 1042 is fixed in position against inner coupling component 168 or may be fixed in position against valve pin holder 1036. Valve pin holder 1036 is slidable within outer coupling component 166. Inner coupling component 168 has a threaded portion 187 that engages with a threaded bore 170 of outer coupling component 166. Inner coupling component 168 has a keyed recess 169 for cooperating with a corresponding keyed tool, e.g. a hex tool (not shown), and can thus be rotated to accurately adjust the downstream end position (not shown) of valve pin 120 with respect to a respective mold gate (not shown). For example, one full revolution or portion thereof of inner coupling component 168 will translate valve pin 120 in the axial direction accordingly with the thread pitch of threaded portion 187. A lock nut 172 may be provided to lock the rotational position of inner coupling component 168 and thus the downstream end position (not shown) of valve pin 120. Inner coupling component 168 and lock washer 172 are an embodiment of a position adjusting mechanism for adjusting the axial position of second coupling part 1042 and valve pin 120 with respect to coupling part 1034 and a respective mold gate (not shown). Aside from the axial length adjustability, operation is similar to the embodiment of FIGS. 4-6 except that in the forward or closing direction of valve pin plate 106 the stopping force $F_S$ experienced by valve pin 120 must overcome the attractive magnetic force between outer coupling component 166 and coupling part 1034 or the attractive magnetic force between coupling part 1034 and valve pin plate 106 to allow valve pin plate 106 to continue moving the remaining valve pins (not shown) which have not experienced a stopping force in the closing direction.

Figure 11:
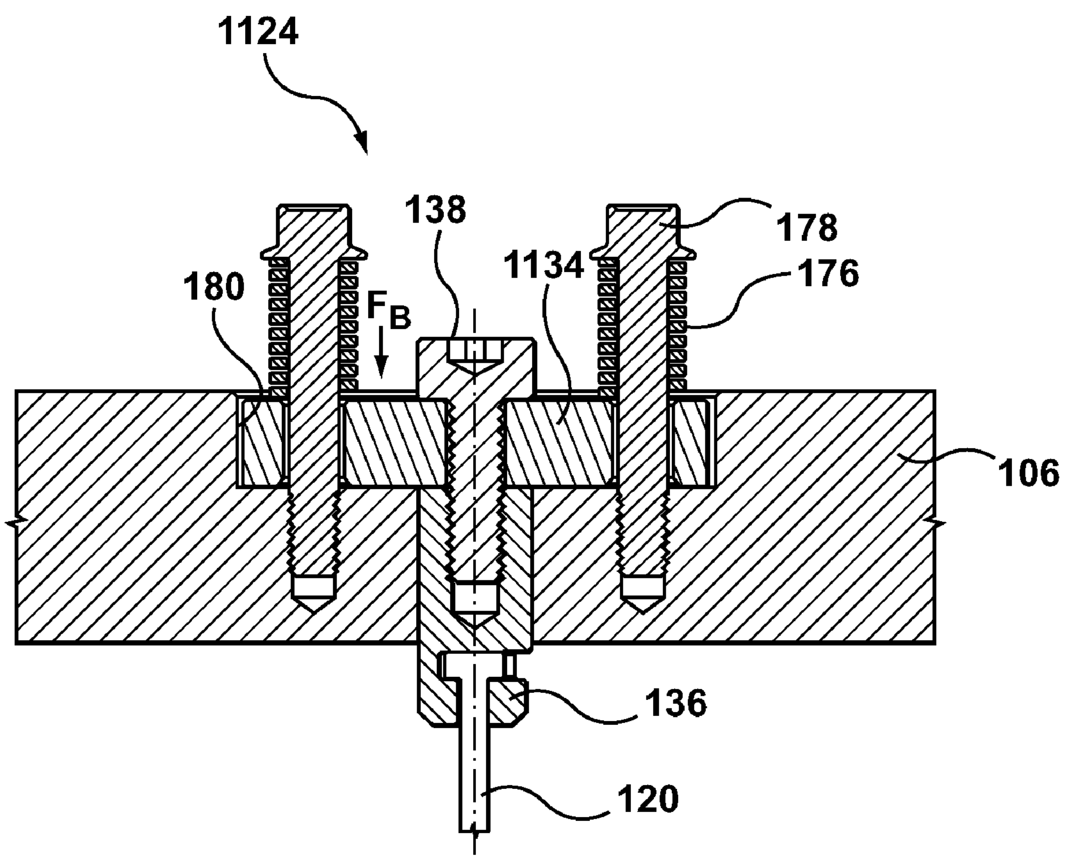
FIG. 11 is a sectional view of a spring biased magnetic coupling in a portion of an injection molding apparatus in accordance with another embodiment hereof.

FIG. 11 is a sectional view of a spring biased single-acting magnetic coupling 1124 in accordance with another embodiment hereof that may be adapted for use in the injection molding apparatus 100 of FIG. 1. Features and aspects of the other embodiments can be used with the present embodiment. In spring biased single-acting magnetic coupling 1124, a coupling part 1134, such as a permanent magnet or any of the afore mentioned magnets is held to valve pin plate 106 by magnetic attraction and further held by dual springs 176 that are coupled to coupling part 1134 and valve pin plate 106 by respective fasteners 178 that protrude from valve pin plate 106 in the rearward direction. A non-limiting example of a fastener is a bolt, such as the shoulder bolt shown as fastener 178, however one skilled in the art will appreciate that a screw or any other type of fastener could be used. Although two springs 176 are shown in FIG. 11, more or fewer springs may be used as required. Springs 176 are arranged to provide a biasing force $F_B$ in the same general direction as the force of the magnetic attraction between coupling part 1134 and valve pin plate 106. In addition, valve pin plate 106 has a rearward facing recess 180 in which coupling part 1134 is located. Rearward facing recess 180 is optional and may be omitted. Operation of spring biased single-acting magnetic coupling 1124 is similar to the embodiment shown in FIGS. 2 and 3, however the biasing force $F_B$ generated by springs 176 will increase the stopping force required to decouple coupling part 1134 and valve pin plate 106. Springs 176 also allow magnets with an attractive magnetic force less than the attractive magnetic force of the magnets selected to maintain coupling between coupling part 1134 and valve pin plate 106 in the embodiments shown in FIGS. 2 and 3 to be used.

Figure 12A:
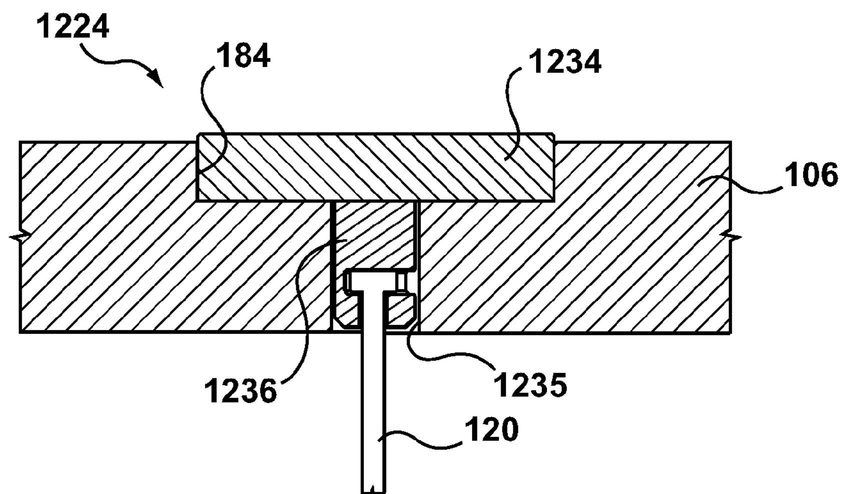
FIGS. 12A-12C are sectional views of a double-acting magnetic coupling in a portion of an injection molding apparatus in accordance with another embodiment hereof, where a valve pin holder is held to a coupling part by magnetic attraction.
Figure 12B:
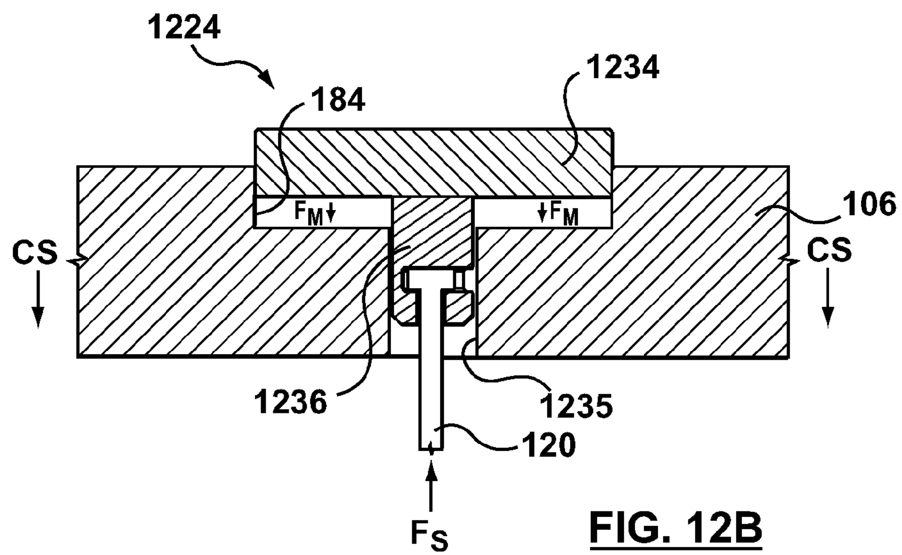
Figure 12C:
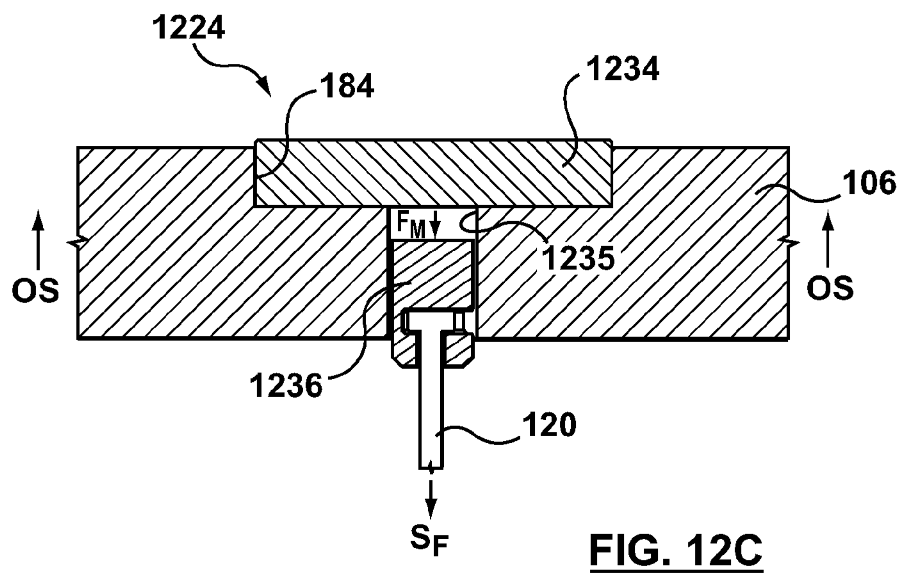

FIGS. 12A-12C are sectional views of a double-acting magnetic coupling 1224 in accordance with another embodiment hereof that may be adapted for use in the injection molding apparatus 100 of FIG. 1. Features and aspects of the other embodiments may be used with the present embodiment. Double-acting magnetic coupling 1224 includes a valve pin holder 1236 that is held to coupling part 1234 by magnetic attraction and slidable within bore 1235 of valve pin plate 106. In this embodiment, coupling part 1234 is a permanent magnet or any of the other aforementioned magnets, and resides in a rearward facing recess 184 of valve pin plate 106. Valve pin holder 1236 may also be a permanent magnet or any of the other aforementioned magnets, or may be made from a magnetically responsive material (such as steel) and contain a permanent magnet, or any of the afore mentioned magnets (not shown), located within its upstream surface. FIG. 12A shows normal operation of valve pin plate 106 with no stopping forces acting upon valve pin 120. FIG. 12B shows a stopping force $F_S$ preventing movement of valve pin 120 when valve pin plate 106 is actuated in the closing direction CS and coupling part 1234 and valve pin 120 have become decoupled from valve pin plate 106. FIG. 12C shows a stopping force $S_F$ preventing movement of valve pin 120 when valve pin plate 106 is actuated in the opening direction OS and valve pin 120 has become decoupled from valve pin plate 106. The remaining features and operation of this embodiment is similar to the double-acting embodiment described with respect to FIGS. 4-6.

Figure 13:
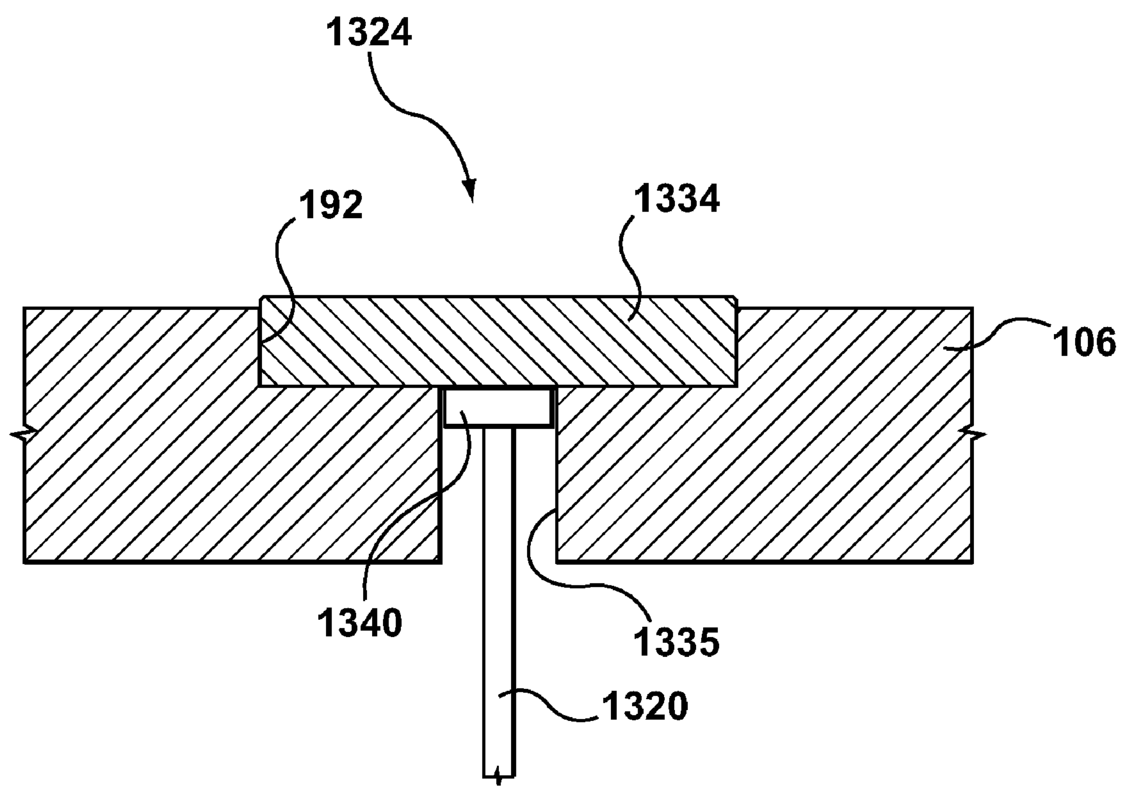
FIG. 13 is a sectional view of a double-acting magnetic coupling in a portion of an injection molding apparatus in accordance with another embodiment hereof, where a head of a valve pin is held to a coupling part by magnetic attraction.

FIG. 13 is a sectional view of a double-acting magnetic coupling 1324 in accordance with another embodiment hereof that may be adapted for use in the injection molding apparatus 100 of FIG. 1. Features and aspects of the other embodiments can be used with the present embodiment. Double-acting magnetic coupling 1324 includes a valve pin 1320 which is held to the coupling part 1334 by magnetic attraction. Coupling part 1334 may be a permanent magnet or any of the other aforementioned magnets. A head 1340 of valve pin 1320 is made of a magnetically responsive material (such as steel) and is held to the coupling part 1334, by magnetic attraction therebetween. Coupling part 1334 resides in a rearward facing recess 192 of valve pin plate 106 and is held to valve pin plate 106 by magnetic attraction therebetween. Valve pin 1320 extends forwardly through a bore 1335 in valve pin plate 106. Both closing direction and opening direction decoupling of coupling part 1334 and valve pin plate 106, and valve pin 1320 and coupling part 1334 respectively, is possible when an aforementioned stopping force is encountered by valve pin 1320 during actuation of valve pin plate 106. The force of magnetic attraction between coupling part 1334 and valve pin plate 106 required to maintain coupling between coupling part 1334 and valve pin plate 106 up to the aforementioned maximum allowable stopping force, as well as the force of magnetic attraction between coupling part 1334 and valve pin head 1340 required to maintain coupling between coupling part 1334 and valve pin head 1340 up to the aforementioned maximum allowable stopping force can be designed to respond as desired, with the respective magnetic forces resulting from the sizing and selection of an appropriate magnet for coupling part 1334 and the sizing and geometry of valve pin head 1340. The remaining features and operation of this embodiment is similar to the double-acting embodiment described with respect to FIGS. 4-6.

While various embodiments according to the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. An injection molding apparatus, comprising:

an actuated part movable in forward and rearward directions;

a coupling part located rearward of the actuated part and held in position against the actuated part by magnetic attraction between the coupling part and the actuated part; and a valve pin coupled to the coupling part, the valve pin extending in the forward direction for opening and closing a mold gate, wherein when the actuated part is moved in the forward direction and a stopping force encountered by the valve pin is greater than a force of the magnetic attraction between the coupling part and the actuated part, the coupling part separates from the actuated part.

2. The injection molding apparatus of claim 1, wherein the coupling part includes a magnet.

3. The injection molding apparatus of claim 1 further comprising:

a valve pin holder, wherein the valve pin is coupled to the valve pin holder.

4. The injection molding apparatus of claim 3, wherein the valve pin holder is fastened to the coupling part.

5. The injection molding apparatus of claim 3 further comprising:

a spacing washer located between the valve pin holder and the coupling part, the spacing washer for adjusting the position of the valve pin.

6. The injection molding apparatus of claim 3, wherein the valve pin holder is held to the coupling part by magnetic attraction therebetween.

7. The injection molding apparatus of claim 1, wherein the valve pin is coupled to the coupling part by magnetic attraction therebetween.

8. The injection molding apparatus of claim 1 further comprising:

a second coupling part that couples the valve pin to the coupling part, the second coupling part located forward of the coupling part and held in position by magnetic attraction between the second coupling part and the coupling part.

9. The injection molding apparatus of claim 8, wherein the second coupling part includes a magnet.

10. The injection molding apparatus of claim 8, wherein when the actuated part is moved in the rearward direction and a stopping force encountered by the valve pin is greater than a force of the magnetic attraction between the coupling part and the second coupling part, the coupling part separates from the second coupling part.

11. The injection molding apparatus of claim 8 further comprising:

a position adjusting mechanism for adjusting the longitudinal position of the second coupling part with respect to the coupling part.

12. The injection molding apparatus of claim 8 further comprising:

a valve pin holder, wherein the valve pin is coupled to the valve pin holder and the valve pin holder is held to the second coupling part by magnetic attraction therebetween.

13. The injection molding apparatus of claim 1, wherein the actuated part is one of a valve pin plate and a piston of an actuator.

14. The injection molding apparatus of claim 1, wherein the valve pin extends through an opening of the actuated part and the coupling part is wider than the opening and straddles the opening.

15. The injection molding apparatus of claim 1 further comprising:

a spring biased against a rearward surface of the coupling part for providing a biasing force between the coupling part and the actuated part.

16. The injection molding apparatus of claim 1, wherein the actuated part includes a recess in which the coupling part is located.

17. An injection molding apparatus, comprising:

a manifold defining a manifold channel for receiving a melt stream of moldable material;

a nozzle defining a nozzle channel in fluid communication with the manifold channel for receiving the melt stream;

a valve pin for controlling flow of the melt stream through a mold gate associated with the nozzle;

an actuated part for moving the valve pin to open and close the mold gate, the valve pin being magnetically coupled to the actuated part, wherein when the actuated part is moved in the forward direction and a stopping force encountered by the valve pin is greater than a force of magnetic attraction coupling the valve pin and the actuated part, the valve pin separates from the actuated part.

18. The injection molding apparatus of claim 17, further comprising:

a coupling part that couples the valve pin to the actuated part, wherein the coupling part is held in position against the actuated part by magnetic attraction therebetween, wherein the coupling part separates from the actuated part when the actuated part is moved in the forward direction and a stopping force encountered by the valve pin is greater than a force of magnetic attraction between the actuated part and the coupling.

19. The injection molding apparatus of claim 18, further comprising:

a valve pin holder, wherein the valve pin is coupled to the valve pin holder and the valve pin holder is held to the coupling part by magnetic attraction therebetween.

20. The injection molding apparatus of claim 19, wherein when the actuated part is moved in the rearward direction and a stopping force encountered by the valve pin is greater than a force of the magnetic attraction between the coupling part and the valve pin holder, the coupling part separates from the valve pin holder.

* * * * *